United States Patent [19]
Eno

[11] Patent Number: 5,501,394
[45] Date of Patent: Mar. 26, 1996

[54] GABLE TOP CARTON HAVING A U-SHAPED STAKE SEAL AND METHOD AND APPARATUS FOR FORMING

[76] Inventor: Kenneth M. Eno, 1816 Slater La., Burnsville, Minn. 55337

[21] Appl. No.: 172,397

[22] Filed: Dec. 22, 1993

[51] Int. Cl.$^6$ ........................................................ B65D 5/08
[52] U.S. Cl. ...................... 229/137; 53/376.6; 53/375.9; 53/477; 53/491; 229/3.1; 229/125.42
[58] Field of Search ...................... 229/3.1, 137, 125.42, 229/213, 249; 53/284.5, 477, 491, 375.9, 376.6, 376.7, 376.8, 377.7, 377.8; 493/133–135, 165, 184

[56] References Cited

U.S. PATENT DOCUMENTS

| | | |
|---|---|---|
| 3,094,432 | 6/1963 | Meyer-Jagenberg . |
| 3,200,557 | 8/1965 | Schwenk . |
| 3,789,746 | 2/1974 | Martensson et al. . |
| 3,956,975 | 5/1976 | Egleston et al. ........................ 53/375.9 |
| 4,145,236 | 3/1979 | Neumayer et al. ...................... 493/133 |
| 4,403,465 | 9/1983 | Bachner ................................... 53/477 |
| 4,730,776 | 3/1988 | Fear . |
| 4,813,546 | 3/1989 | Gordon et al. . |
| 4,834,241 | 5/1989 | Southern . |
| 4,887,720 | 12/1989 | Farber . |
| 4,946,041 | 8/1990 | Poole . |
| 5,083,702 | 1/1992 | Wyberg . |
| 5,125,569 | 6/1992 | Anderson et al. ................. 229/125.42 |
| 5,214,905 | 6/1993 | Wyberg ................................... 493/184 |
| 5,230,204 | 7/1993 | Hall et al. ................................. 53/477 |
| 5,242,701 | 9/1993 | Poole ................................. 229/125.42 |

FOREIGN PATENT DOCUMENTS

| | | | |
|---|---|---|---|
| 2305346 | 10/1976 | France ................................... 53/376.6 |
| 199845 | 8/1989 | Japan ................................. 229/125.42 |

Primary Examiner—Gary E. Elkins
Attorney, Agent, or Firm—McAndrews, Held & Malloy, Ltd.

[57] ABSTRACT

A gable top carton employs a stake joint having spaced apart legs disposed longitudinally on opposite sides of a channel, the channel being formed when a carton blank is folded to form the gable top carton. The spaced apart legs urge the material at the sides of the channel toward the center of the channel to effect a channel seal. The stake seal may be in the form of an inverted U-shaped stake seal. A method and apparatus for forming the stake seal are also contemplated.

25 Claims, 7 Drawing Sheets

Fig. 8
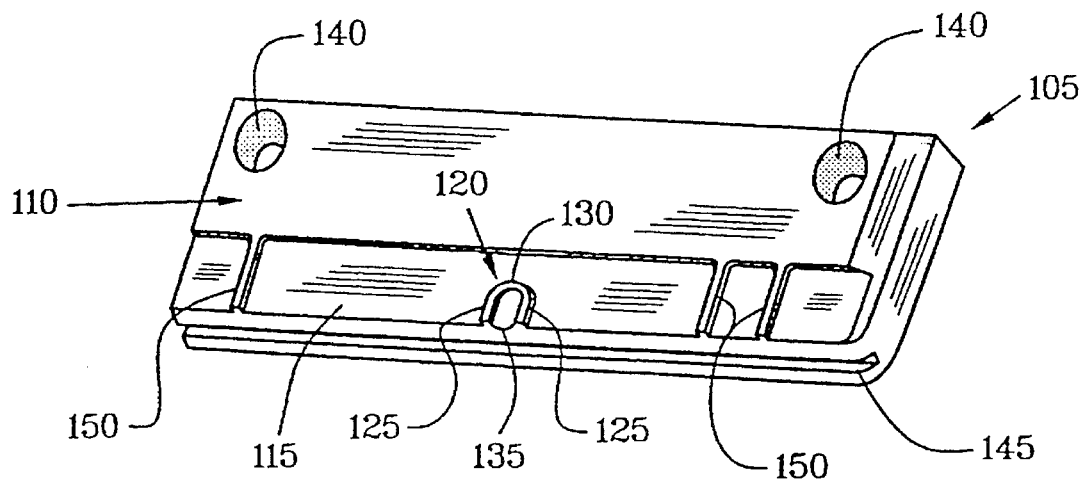
Fig. 10
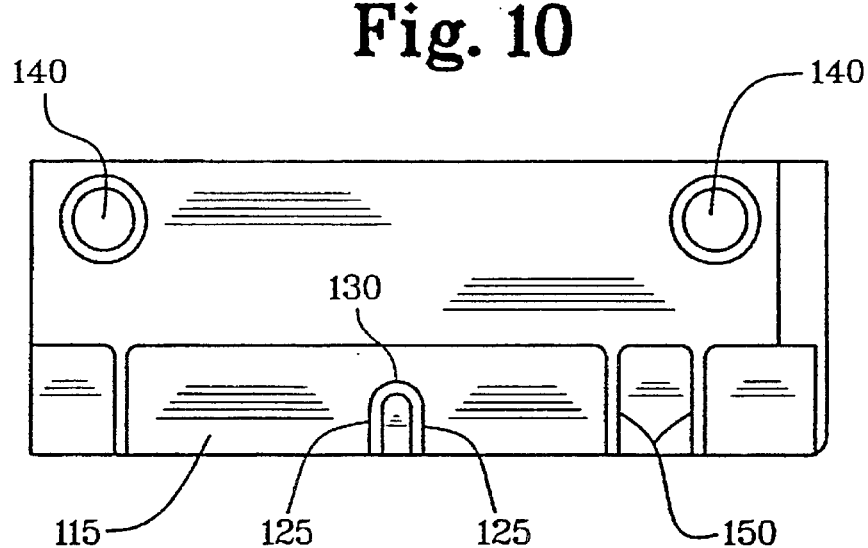
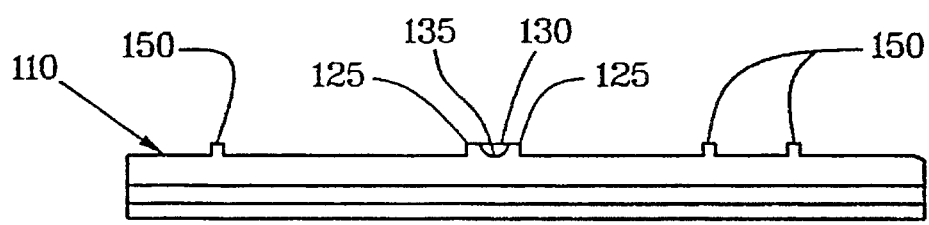
Fig. 9

GABLE TOP CARTON HAVING A U-SHAPED STAKE SEAL AND METHOD AND APPARATUS FOR FORMING

TECHNICAL FIELD

The present invention relates to the sealing of a top fin of a gable top container. Specifically, the present invention relates to the sealing of a channel that is created when carton blanks are folded to form a gable top container.

BACKGROUND

Gable top cartons have been known for the better part of the twentieth century. Their characteristic simplicity and resealability have helped to sustain their popularity as containers for traditional liquid food products such as milk and juice, but in recent years they have been used for products ranging from ammunition to Epsom salts. Gable top cartons typically start out as generally rectangular carton blanks made of laminated paperboard or similar material. The carton blanks are provided with a number of creases to facilitate folding and forming the blank into a carton.

During decades of development, manufacturers of packaging machines have devised a variety of ways to form, fill and seal gable top cartons. Today, the most prevalent packaging machines for gable top cartons are adapted to receive the carton blank after it has been side sealed. The process of side sealing opposite vertical edges of the carton blank together to form a polygonal (usually rectangular) sleeve. The sleeve is received on an indexable mandrel wheel, which rotates the sleeve into respective positions where the end of the sleeve extending outwardly from the mandrel is folded and sealed to form the bottom of the carton.

After the carton bottom has been formed, the carton is then removed from the mandrel and transposed to a filing station, where the carton is filled with product. Once the carton has been filled, the top of the carton is folded and into the familiar gable top configuration and is heat sealed, thus completing the packaging process. One example of a known packaging machine that operates generally in accordance with these principles is described in U.S. Pat. No. 3,789,746 to Martensson et al.

When the top panels of the container are folded to form the familiar gable top configuration, a channel is formed at the mid-section of the top fin. The channel extends from the interior to the exterior of the container and is exposed to the product contents. The channel must therefore be sealed to prevent leakage of the product. Traditionally, the channel of the top fin has been sealed by forming either a vertically or horizontally extending stake at the channel site. During the sealing process, a pair of sealing jaws compress the top fin. The jaws have raised portions that form the stake.

The traditional stake configurations break the barrier material in the region of the channel thereby leaving portions of the paperboard exposed to the product. When the product, for example, is a liquid such as milk or orange juice, the product begins "wicking" through the paperboard substrate of the top fin. Such wicking may compromise the seal of the top fin over the shelf life of the product and, further, may result in an accumulation of the product along the top fin that may be repulsive to the consumer when the carton is opened.

SUMMARY OF THE INVENTION

A carton is set forth that overcomes many of the problems of the prior art by employing a stake joint having spaced apart legs disposed on opposite sides of a channel of a top fin that urge the material at the sides of the channel toward the center of the channel to effect a channel seal. In one embodiment, the carton employs an inverted U-shaped stake seal at the top fin of a gable top container. In that embodiment, the container includes first, second, third, and fourth top gable flaps and first, second, third, and fourth top fin flaps. The gable flaps and the fin flaps have a plurality of score lines along which the flaps are folded to form a gable top having a fin. The fin is formed from at least the top fin flaps and, prior to application of the stake seal, has a channel that extends from the interior of the container that must be sealed. The inverted U-shaped stake seal is formed on the fin to seal the channel.

The inverted U-shaped stake seal includes two opposing leg portions joined by a curved portion. The two opposing leg portions are disposed longitudinally on opposite sides of the channel while the curved portion traverses the channel and functions as a back-up stake seal.

Apparatus and corresponding methods of forming the inverted U-shaped stake seal are also contemplated. In accordance with one embodiment of an apparatus for forming the stake seal, a sealing jaw is utilized that comprises a plate having a generally flat face portion. The plate includes an inverted U-shaped ridge extending from the flat face portion. The inverted U-shaped ridge engages the fin of the gable top carton to seal, for example, the channel described above.

In accordance with one method of forming the inverted U-shaped stake seal, a first sealing jaw is provided that has a generally inverted U-shaped ridge extending from it. A second jaw having a generally flat face portion is also provided. The gable top container is placed in a position to allow the first and second jaws to engage the fin when the jaws are urged toward one another. When the jaws are urged toward one another, they engage the fin and seal the channel with the inverted U-shaped stake seal.

Other objects and advantages of the present invention will become apparent upon reference to the accompanying detailed description when taken in conjunction with the following drawings.

BRIEF DESCRIPTION OF THE DRAWINGS

FIG. 8 is a perspective view of a sealing jaw for forming a U-shaped stake seal.

FIG. 9 is a side view of the sealing jaw of FIG. 8.

FIG. 10 is a front view of the sealing jaw of FIG. 8.

DETAILED DESCRIPTION OF THE PREFERRED EMBODIMENT

Figure 1:
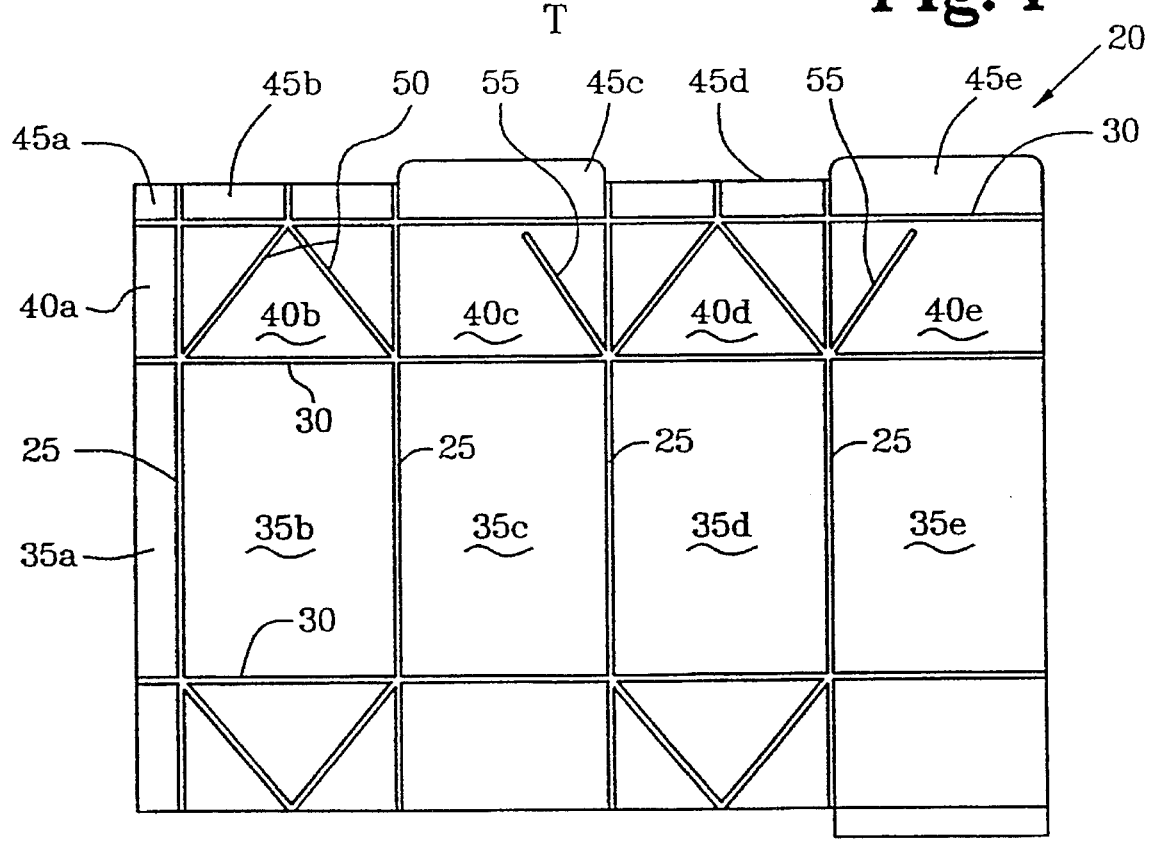
FIG. 1 is a plan view of a carton blank.

FIG. 1 illustrates a carton blank 20 for forming a gable top carton. The blank 20 may be formed from any one of a variety of paperboard laminate structures. For example, the blank may be formed from a laminate, such as that used for milk cartons, having an LDPE/PAPERBOARD/LDPE structure. In such a laminate, the LDPE layers act as barrier layers that, among other things, protect the paperboard from moisture. Other paperboard laminate structures may also be used in which the paperboard is protected by one or more barrier layers.

The blank 20 is divided by a plurality of vertical creases 25 and a plurality of horizontal creases 30. The vertical creases 25 extend from the top T to the bottom B of the carton blank while the horizontal creases 30 extend substantially along the width of the carton blank. The horizontal and vertical creases 25, 30 divide the carton blank into five vertical panels 35a–e, five top gable flaps 40a–e, and five top fin flaps 45a–e. Top gable flaps 40b and 40d are each provided with a pair of converging creases 50. Top gable flaps 40c and 40e are each provided with an angled crease 55.

Figure 2:
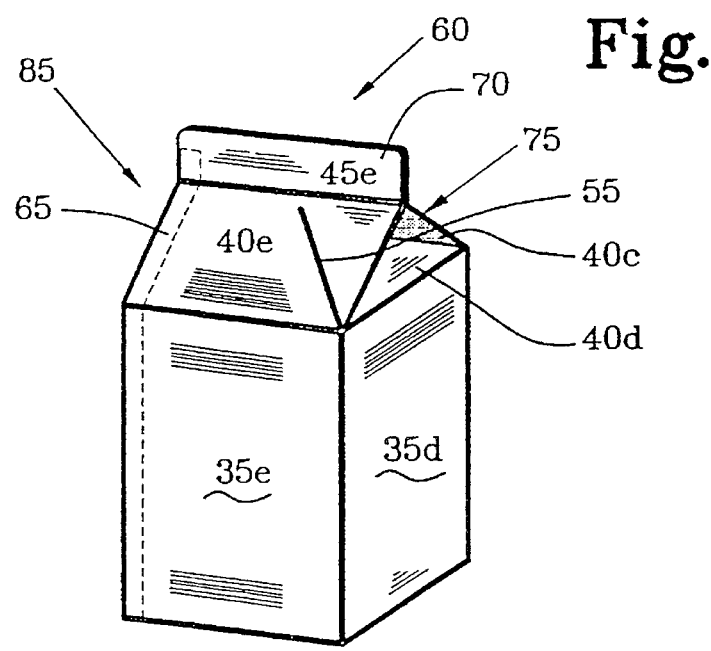
FIG. 2 is a perspective view of a gable top carton formed from the carton blank of FIG. 1.

The blank 20 of FIG. 1 is folded to form the gable top container 60 of FIG. 2. When folded, the vertical panels 35b–c form respective sides of the container 60. The top gable flaps 40b–c form a gable structure 65 while the top fin flaps 45b–c form the top fin 70. The gable structure 65 is formed by folding top gable flaps 40a and 40d toward one another. Top gable flaps 40c and 40e are likewise folded toward one another and overlie top flaps 40a and 40d to form the gable structure 65. The top fin 70 extends upward from the gable structure 65. The angled creases 55 are disposed at an opening end 75 of the container 60 and allow the gable flaps 40c–e and fin flaps 45c–e of the container 60 to be unfolded for opening the container. The flaps of the opening end 75 may be returned to their generally closed condition when the user wishes to at least partially seal the container. The opening end 75 is opposite a closed end 85.

Figure 3:
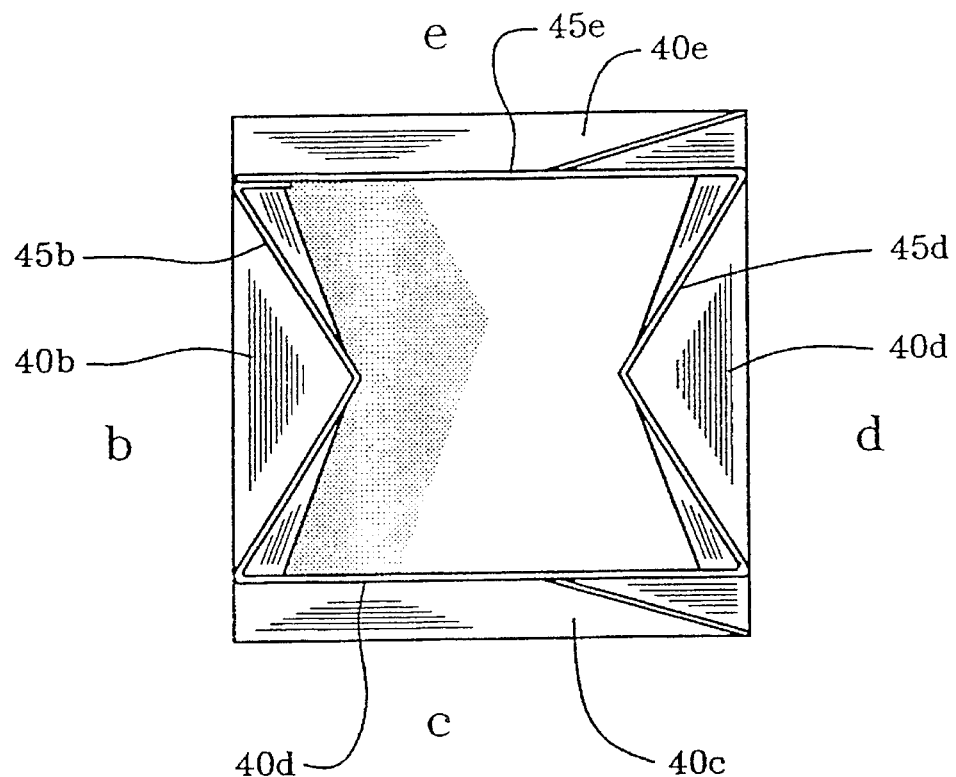
FIG. 3 is a top view of a gable carton wherein the top is in a partially closed state to illustrate the folding of the carton blank forming the gable top.
Figure 4:
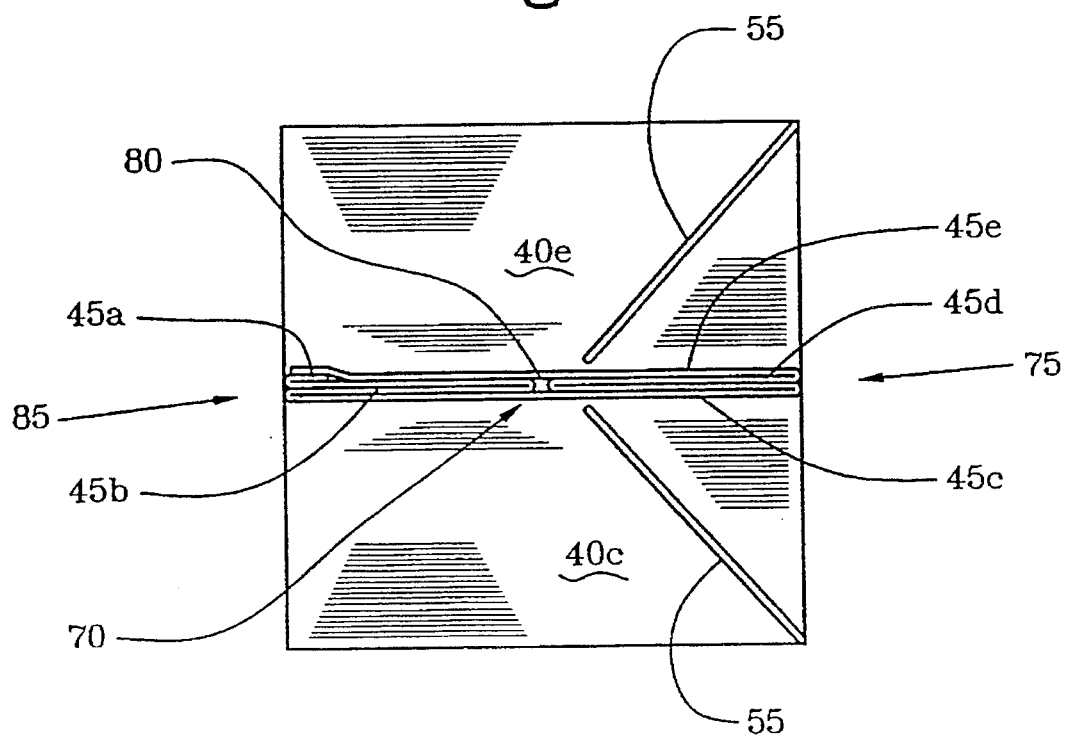
FIG. 4 is a top view of the carton of FIG. 3 with all of the flaps forming the gable top folded to a closed position.

FIG. 3 is a top view showing the manner in which the blank 20 is folded to form the gable structure 65 and fin 70 of the gable top carton 60 and illustrates the relative positions of the flaps. As illustrated, the top gable flaps 40b and 40d are folded inwardly toward one another and thus urge fin flaps 45b and 45d toward one another as well. The fin flaps 45b and 45d, however, do not overlap one another and thus leave a channel 80, such as illustrated in FIG. 4, midway between the opening end 75 and closed end 85 of the fin 70. The channel 80 extends from the interior of the container to the exterior of the container. The portion of the channel 80 at the interior of the container is exposed to the contents of the container and, therefore, the channel 80 must be sealed.

FIG. 4 illustrates an inverted U-shaped stake seal 90 after its application to the top fin 70 of the container 60. As illustrated, the inverted U-shaped stake seal 90 includes two opposed leg portions 95 that are joined by a curved portion 100. The leg portions 95 extend longitudinally on opposite sides of the channel 80 (now closed) while the curved portion 100 extends transversely across the upper portion of the channel 80. When the leg portions 95 are formed in the top fin 70, the material on opposite sides of the channel 80 is urged toward the center of the channel thus effectively eliminating the channel and sealing it to prevent leakage of the container contents.

Although the barrier material may be broken in the region of the stake, there is no wicking. The legs 95 do not overlie an interior container area that is exposed to the container contents. The portions of the paperboard exposed as a result of any breaking of the barrier layer are thus not placed in contact with the container contents. Additionally, since the opposite sides of the channel have been forced together to seal it, any paperboard exposed at the curved portion 100 of the inverted U-shaped stake 90 is not exposed to the container contents. In the unlikely event that the channel 80 is not effectively sealed when the material on the sides of the channel is urged together, the curved portion 100 acts as a conventional horizontal stake seal and maintains the integrity of the channel seal.

Figure 6:
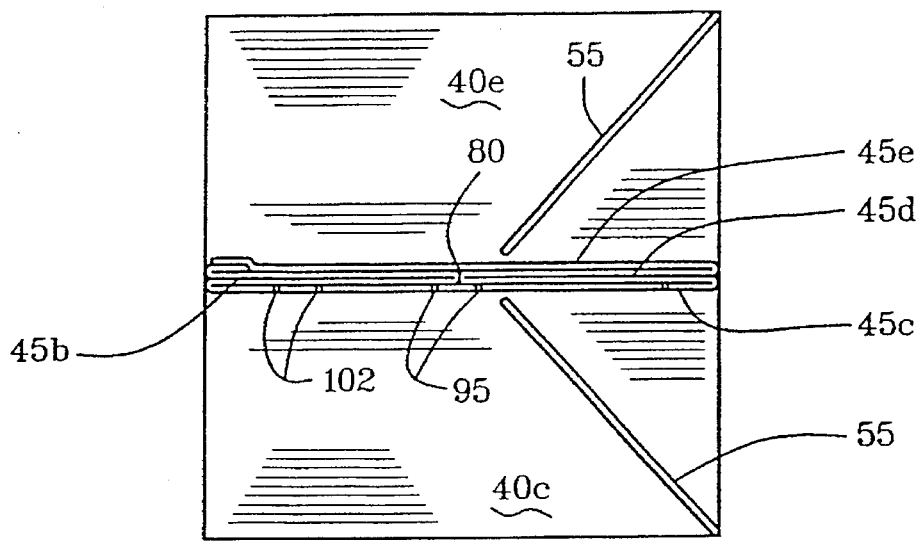
FIG. 6 is a top cross-sectional view of the carton of FIG. 5 illustrating the sealing of the channel.
Figure 5:
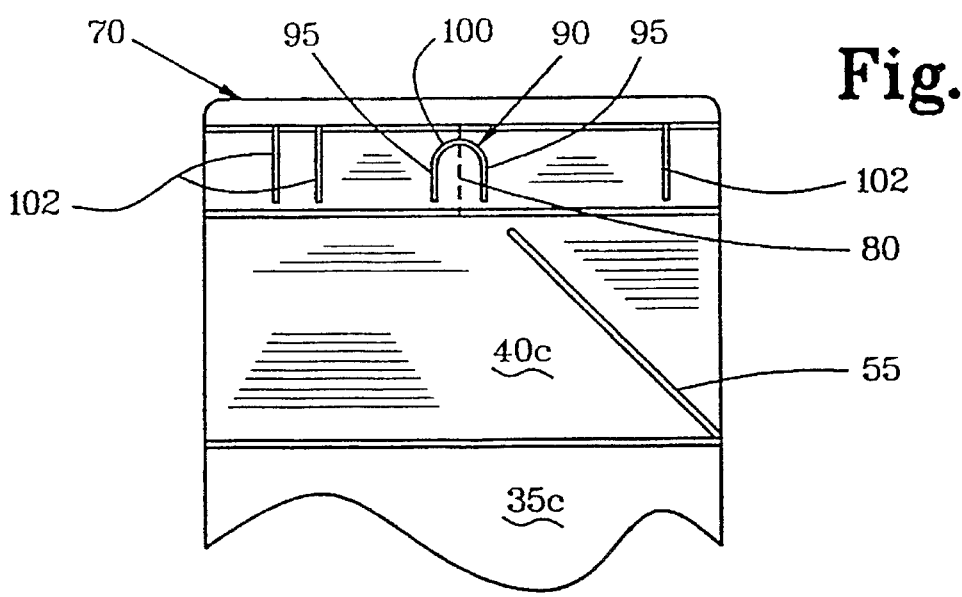
FIG. 5 is a side view of the gable top of a gable top carton wherein an inverted U-shaped stake seal has been used to close a channel of a top fin.
Figure 7:
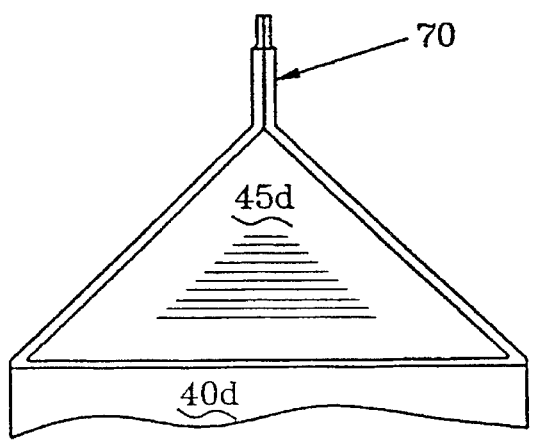
FIG. 7 is a side view of the sealed gable top carton of FIG. 5.

The sealed gable top may include vertical stakes 102 to further assist in sealing the fin 70. Since these stakes do not overlie the container contents, wicking is generally not a problem at these stake locations. Top and side views of the sealed gable top are also shown in FIGS. 6 and 7.

A sealing jaw 105 for forming the inverted U-shaped stake seal 90 is shown in FIGS. 8–10. As illustrated, the sealing jaw 105 includes a plate 110 having a generally flat face portion 115. An inverted U-shaped ridge 120 extends from the flat face portion 115. The U-shaped ridge 120 includes two opposed leg ridges 125 that are joined by a curved ridge 130. An arcuate valley 135 is disposed in the region between the two opposed leg ridges 125. The radius of the arcuate valley 135 and the dimensions of the inverted U-shaped ridge 120 are defined by the size of the channel that is to be sealed and by the carton laminate structure.

Other structures are also present on the sealing jaw 105. The sealing jaw 105 includes a pair of bore holes 140 that are used to mount the jaw for use on a packaging machine. A guide channel 145 is also provided for this purpose. Several linear ridges 150 extend from the flat face portion and are used to form the vertical stakes 102 that assist in sealing the top fin 70 of the gable top container.

Figure 11:
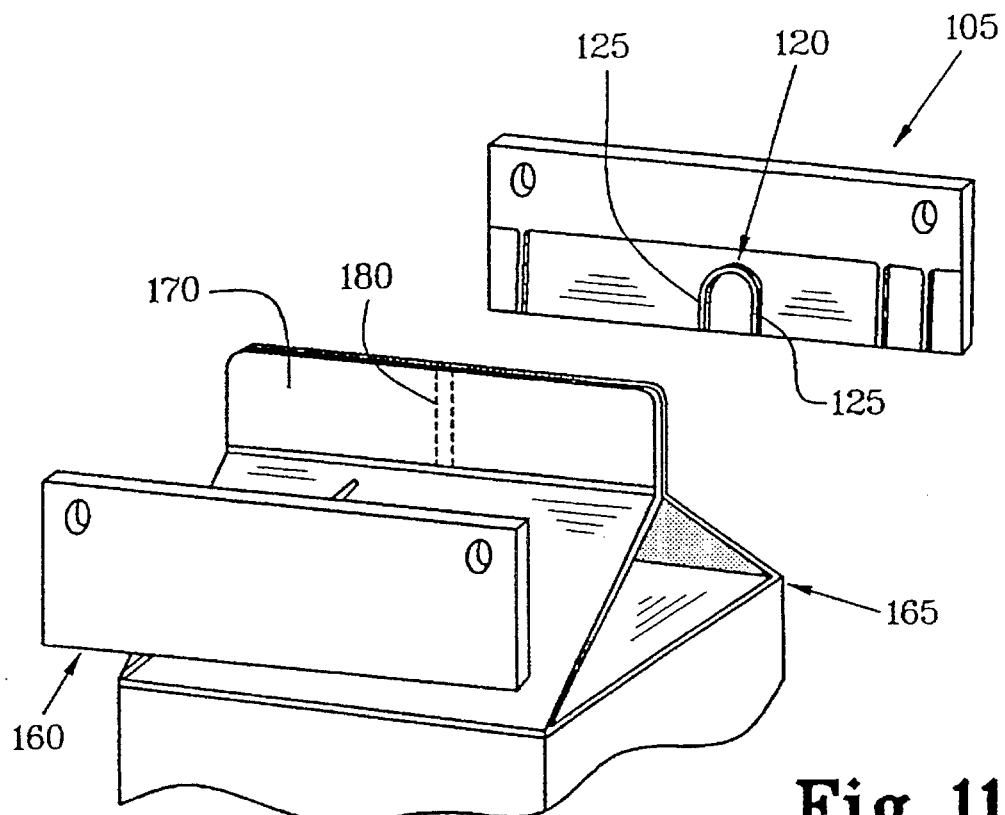
FIG. 11 is a perspective view showing the use of the sealing jaw of FIG. 8 as applied to seal the fin of a gable top container wherein the jaws are in an open condition.
Figure 12:
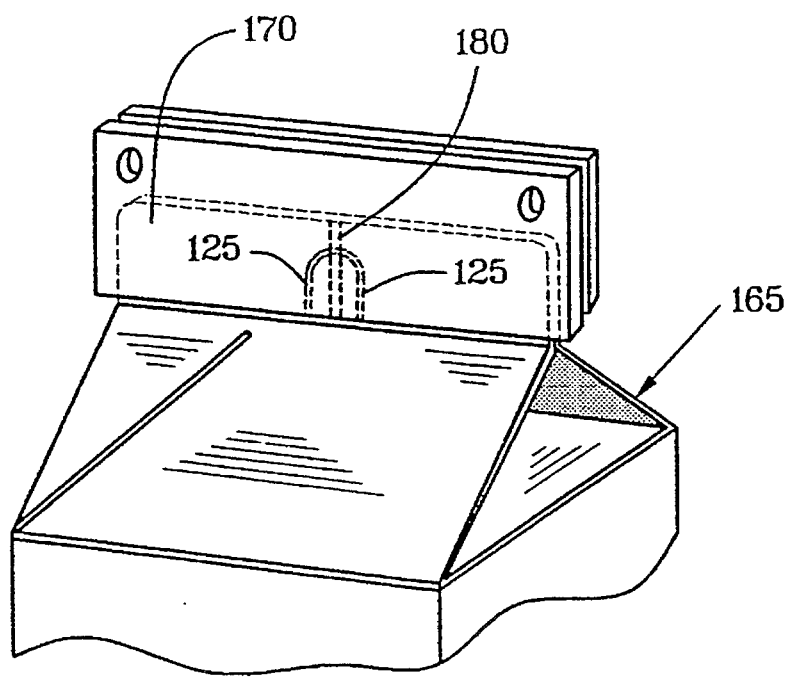
FIG. 12 is a perspective view showing the use of the sealing jaw of FIG. 8 as applied to seal the fin of a gable top container wherein the jaws are in a closed condition engaging the fin.
Figure 13:
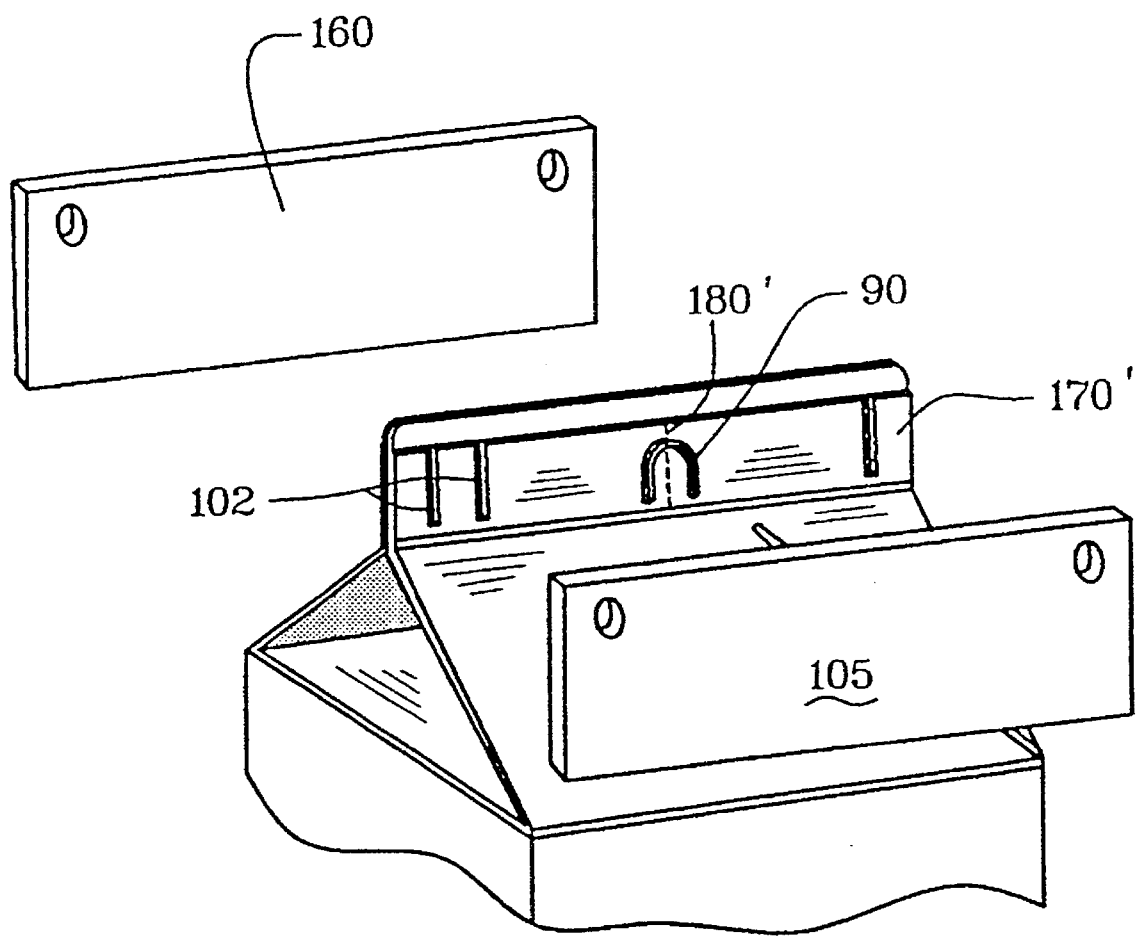
FIG. 13 is a reverse angle view showing the use of the sealing jaw of FIG. 8 as applied to seal the fin of a gable top container wherein the jaws are in an open condition after the fin has been sealed.

FIGS. 11–13 illustrate the manner in which the sealing jaw 105 may be used to apply an inverted U-shaped stake seal to the fin 170 of a gable top carton. In a packaging machine (not illustrated), the sealing jaw 105 is juxtaposed to a generally flat plate 160. An unsealed gable top carton 165 that has been folded and filled is placed between the sealing jaw 105 and flat plate 160 so that its unsealed fin 170 is disposed between them. As illustrated in FIG. 12, the jaw 105 and flat plate 160 are moved relative to one another and engage the unsealed top fin 170 of the carton so that the opposing leg portions 125 of the inverted U-shaped ridge 120 engage the longitudinal opposing sides of the channel 180. The jaw 105 and flat plate 160 engage the fin 170 with a force sufficient to seal and imprint the stake seals on the fin 170. As this force is applied, the opposing leg portions 125 urge the carton material on the sides of the channel 180 toward the center of the channel thus effectively closing it and preventing leakage therethrough. The barrier material in the region of the channel directly overlying the container contents is not broken during this sealing process, and, therefore, the application of the inverted U-shaped stake seal does not give rise to wicking.

FIG. 13 is a reverse angle view of the gable top carton 165 with a sealed fin 170' after the sealing jaw 105 and plate 160 are separated from the position shown in FIG. 12. After sealing, the carton includes the inverted U-shaped stake seal 90 over the now sealed channel 180'. Additional stake seals 102 are also included.

Figure 14:
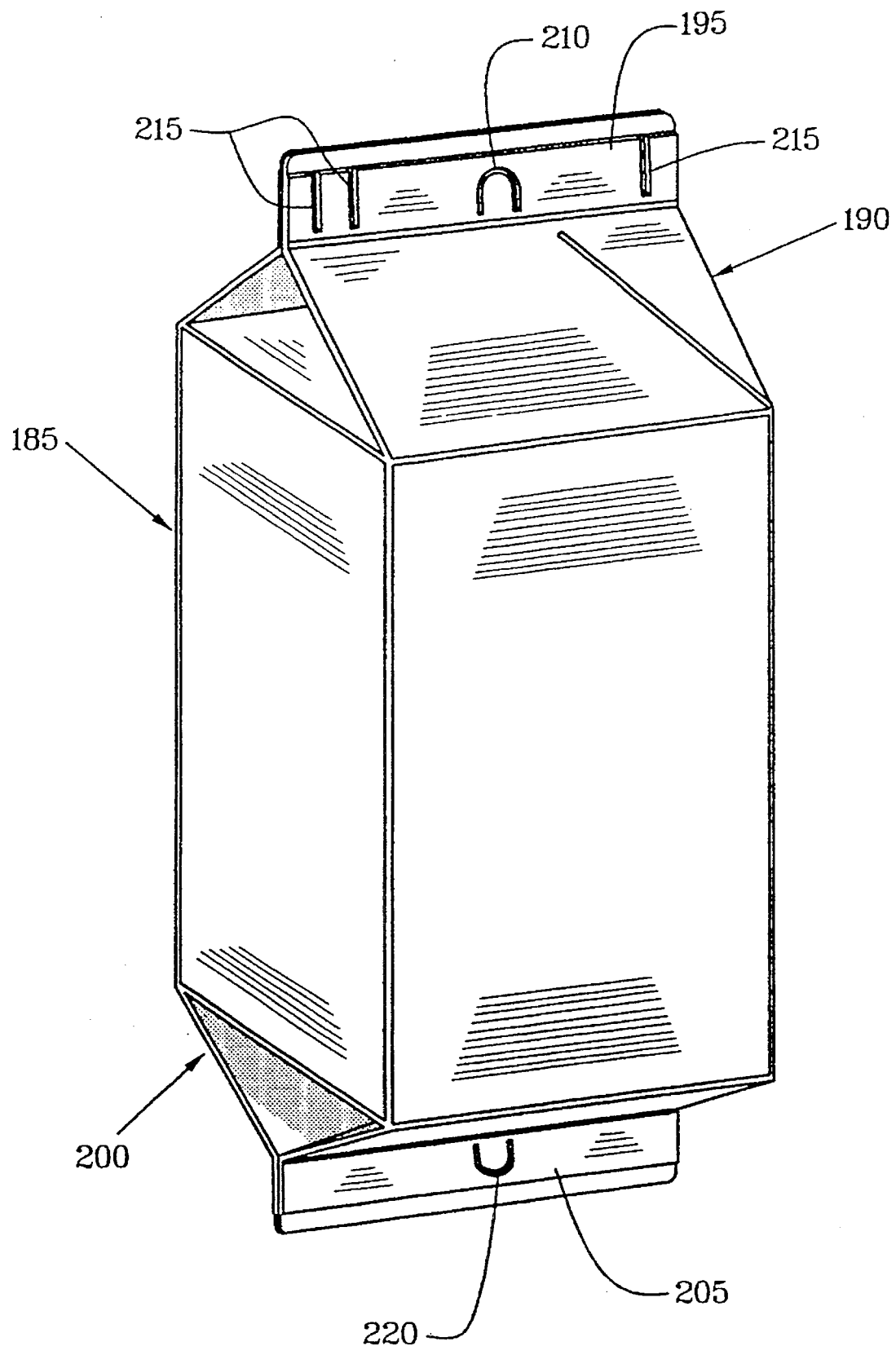
FIG. 14 is a perspective view of a gable top carton wherein the bottom also includes a gable structure and fin and wherein a U-shaped stake seal is used to seal both the top and bottom fins.

FIG. 14 is perspective view of a gable top carton 185 having a top gable structure 190 and fin 195 and bottom gable structure 200 and fin 205. The top fin includes an inverted U-shaped stake seal 210 as well as several additional vertical stake seals 215. Similarly, the bottom fin 205 includes a U-shaped stake seal 220 that seals the channel of the bottom fin 205. Although not specifically shown, the bottom fin may likewise include vertical stake joints. Both the top and bottom U-shaped channel stake 210, 220 may be formed in accordance with the method described above using the sealing jaws that are likewise disclosed above.

Unlike the top gable structure 190, the bottom gable structure 200 does not include score lines defining an opening end. This is because the bottom gable structure 200 and fin 205 are usually, although not necessarily, flattenned after filling to allow the container to sit generally flat on a surface.

Although the present invention has been described with reference to a specific embodiment, those of skill in the art will recognize that changes may be made thereto without departing from the scope and spirit of the invention as set forth in the appended claims.

I claim as my invention:

1. A gable top carton comprising:
   a) a gable top;
   b) a fin extending from the gable top;
   c) an inverted U-shaped stake seal for sealing a channel of the fin.

2. A gable top carton as claimed in claim 1 wherein the inverted U-shaped stake seal includes two opposing legs joined by a curved portion, the two opposing legs being disposed longitudinally on opposite sides of the channel of the fin.

3. A gable top carton as claimed in claim 1 wherein the gable top carton has an opening end and a closed end, the fin extending between the opening end and the closed end, the inverted U-shaped stake seal being formed on the fin at a location generally midway between the opening end and the closed end.

4. A gable top carton as claimed in claim 1 and further comprising a stake line formed on the fin.

5. A gable top carton having an interior for containing a product and an exterior, the gable top carton comprising:
   a) first, second, third, and fourth top gable flaps;
   b) first, second, third, and fourth top fin flaps;
   c) the gable flaps and the fin flaps having a plurality of score lines and being folded along at least some of the plurality of score lines to form a gable top having a fin extending therefrom, the fin formed from at least the top fin flaps, folding of the top fin flaps forming a channel extending from the interior of the carton; and
   d) an inverted U-shaped stake seal formed on the fin to seal the channel.

6. A gable top carton as claimed in claim 5 wherein the inverted U-shaped stake seal includes two opposing leg portions joined by a curved portion, the two opposing leg portions being disposed on opposite sides of the channel.

7. A gable top carton as claimed in claim 6 and further comprising:
   a) one or more score lines defining an opening end of the gable top carton, the gable top carton having a closed end opposite the opening end; and
   b) the inverted U-shaped stake seal formed on the fin at a location generally midway between the opening end and the closed end of the gable top carton.

8. A gable top carton as claimed in claim 7 and further comprising:
   a) a first stake line formed on the fin at the closing end of the gable top; and
   b) a second stake line formed on the fin at the opening end of the gable top.

9. A gable top carton as claimed in claim 6 and further comprising a stake line formed on the fin.

10. A sealing jaw for sealing a channel of a fin of a gable top carton, the sealing jaw comprising:
    a) a plate having a generally flat face portion;
    b) an inverted U-shaped ridge extending from the generally flat face portion of the plate for engagement with the fin of the gable top carton.

11. A sealing jaw as claimed in claim 10 wherein the generally inverted U-shaped ridge comprises first and second opposing legs joined by a curved ridge and an arcuate valley of a predetermined radius extending between the first and second opposing legs.

12. A sealing jaw as claimed in claim 10, the gable top carton having an opening end, a closed end opposite the opening end, and a fin running between the opening end and the closed end, the inverted U-shaped ridge extending from the generally flat face portion of the plate for engagement with the top fin of a gable top carton at a portion of the top fin that is generally midway between the opening end and the closed end.

13. A sealing jaw as claimed in claim 10 wherein the inverted U-shaped ridge extending from the generally flat face portion of the plate is shaped so that the first and second opposing legs longitudinally engage respective opposite sides of the channel.

14. A method for sealing a channel in a top fin of a gable top container, the method comprising the steps of:
    a) providing a first jaw having an inverted U-shaped ridge extending therefrom;
    b) providing a second jaw having a generally flat face portion;
    c) placing the gable top container in a position to allow the first and second jaws to engage the fin when the first and second jaws are urged toward one another;
    d) urging the first and second jaws toward one another to seal the channel of the fin with an inverted U-shaped stake seal.

15. A method for sealing a top fin of a gable top container as claimed in claim 14, wherein the gable top carton has an opening end, a closed end opposite the opening end, and a fin running between the opening end and the closed end, and wherein the step of urging the first and second jaws toward one another is further defined by urging the first and second jaws toward one another to seal the fin with an inverted U-shaped stake seal in a region of the top fin that is generally midway between the opening end and the closed end.

16. A method for sealing a top fin of a gable top container as claimed in claim 14, wherein the step of providing a first jaw is further defined by providing a first jaw having an inverted U-shaped ridge extending therefrom, the inverted U-shaped ridge having a pair of opposed leg ridges joined by a curved ridge.

17. A method for sealing a top fin of a gable top container as claimed in claim 16 and further defined by providing an arcuate valley between the pair of opposed legs.

18. A method for sealing a channel of a top fin of a gable top container, the channel extending from the interior of the container, the method comprising the steps of:
   a) providing a first jaw having an inverted U-shaped ridge extending therefrom, the inverted U-shaped ridge having two opposed legs and a generally curved portion extending between the opposed legs;
   b) providing a second jaw having a generally flat face portion;
   c) placing the gable top container in a position to allow the first and second jaws to engage the fin when the first and second jaws are urged toward one another; and
   d) urging the first and second jaws toward one another to engage the fin, the opposed legs of the inverted U-shaped ridge engaging opposite sides of the channel and urging material disposed on either side of the channel toward the channel center to thereby seal the channel.

19. A method for sealing a top fin of a gable top container as claimed in claim 18, wherein the step of providing a first jaw is further defined by providing an arcuate valley of a predetermined radius between the opposed legs.

20. A gable top carton comprising:
   a) a gable structure;
   b) a fin extending from the gable structure;
   c) a pair of vertical stake seals disposed on opposite sides of add proximate to a vertical channel of the fin for sealing the vertical channel.

21. A gable top carton as claimed in claim 20 wherein the pair of vertical stake seals are joined by a curved stake seal to form an inverted U-shaped stake seal.

22. A method for sealing a channel of a top fin of a gable top container, the channel extending from the interior of the container, the method comprising the steps of:
   a) providing a first jaw having a pair of opposed leg ridges extending therefrom;
   b) providing a second jaw having a generally flat face portion;
   c) placing the gable top container in a position to allow the first and second jaws to engage the fin when the first and second jaws are urged toward one another;
   d) urging the first and second jaws toward one another to engage the fin, the opposed leg ridges longitudinally engaging opposite sides of the channel to urge material disposed longitudinally on opposite sides of the channel toward a central portion of the channel to thereby seal the channel.

23. A method for sealing a top fin of a gable top container as claimed in claim 22, wherein the step of providing a first jaw is further defined by providing an arcuate valley of a predetermined radius between the opposed legs.

24. A gable top carton comprising:
   a) a top gable structure;
   b) a top fin extending from the top gable structure;
   c) a first pair of vertical stake seals disposed longitudinally on opposite sides of a channel of the top fin for sealing the channel;
   d) a bottom gable structure;
   e) a bottom fin extending from the bottom gable structure; and
   f) a second pair of vertical stake seals disposed longitudinally on opposite sides of a channel of the bottom fin for sealing the channel of the bottom fin.

25. A gable top carton as claimed in claim 24 wherein the first and second pair of vertical stake seals are joined by respective curved stake seals to form U-shaped stake seals respectively on said top and bottom fins.

* * * * *

UNITED STATES PATENT AND TRADEMARK OFFICE
CERTIFICATE OF CORRECTION

PATENT NO. : 5,501,394
DATED : March 26, 1996
INVENTOR(S) : Kenneth M. Eno

It is certified that error appears in the above-indentified patent and that said Letters Patent is hereby corrected as shown below:

COLUMN 1, LINE 35

Cancel "transposed" and insert - -transported - - therefor.

COLUMN 7, LINE 37

Cancel "add" and insert - - and - - therefor.

Signed and Sealed this

Twenty-seventh Day of August, 1996

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,501,394

DATED : March 26, 1996

INVENTOR(S) : Kenneth M. Eno

It is certified that error appears in the above-identified patent and that said Letters Patent is hereby corrected as shown below:

On the title page, please add "Patrick N. Burkhart" in the "Attorney, Agent or Firm" section.

IN COLUMN 1, LINE 35

Cancel "transposed" and insert --transported-- therefor.

IN COLUMN 7, LINE 37

Cancel "add" and insert --and-- therefor.

This certificate supersedes Certificate of Correction issued August 27, 1996.

Signed and Sealed this

Eighth Day of October, 1996

Attest:

BRUCE LEHMAN

*Attesting Officer*     *Commissioner of Patents and Trademarks*